(12) United States Patent
Balkau et al.

(10) Patent No.: US 7,810,426 B2
(45) Date of Patent: Oct. 12, 2010

(54) DEVICE FOR PREPARING FROTH

(75) Inventors: Walter Balkau, Schwändl (CH);
Rüdiger Ternité, Hamburg (DE);
Hartwig Meyer-Ruhstrat, Stelle (DE)

(73) Assignee: Tchibo GmbH (DE)

( * ) Notice: Subject to any disclaimer, the term of this patent is extended or adjusted under 35 U.S.C. 154(b) by 823 days.

(21) Appl. No.: 11/561,256

(22) Filed: Nov. 17, 2006

(65) Prior Publication Data
US 2007/0131797 A1 Jun. 14, 2007

(30) Foreign Application Priority Data
Nov. 18, 2005 (DE) .................. 10 2005 055 124

(51) Int. Cl.
*A47J 31/40* (2006.01)
*A47J 31/44* (2006.01)
(52) U.S. Cl. .................. 99/323.1; 99/293; 141/70; 141/82; 261/DIG. 76; 366/101
(58) Field of Classification Search .............. 99/323.1, 99/293, 452, 453; 141/70, 82; 261/DIG. 76, 261/DIG. 16, 76; 366/101
See application file for complete search history.

(56) References Cited

U.S. PATENT DOCUMENTS

| 4,735,133 A * | 4/1988 | Paoletti ................ 99/454 |
| 5,769,135 A * | 6/1998 | Mahlich ................ 141/70 |
| 5,862,740 A * | 1/1999 | Grossi ................ 99/293 |
| 6,644,177 B1 * | 11/2003 | Hsu ................ 99/453 |
| 6,786,138 B2 * | 9/2004 | Johnson et al. ......... 99/323.1 |

FOREIGN PATENT DOCUMENTS

| DE | 3538041 A1 | 10/1985 |
| DE | 8806220 U1 | 11/1988 |

* cited by examiner

*Primary Examiner*—Reginald L Alexander
(74) *Attorney, Agent, or Firm*—Hovey Williams LLP

(57) ABSTRACT

A device for preparing froth, in particular for preparing milk froth by means of hot steam output by a domestic coffee machine, contains an elongate nozzle body having a rear end and a front end, which can be connected in the region of its rear end to a hot steam source and which has an outlet nozzle in the region of its front end. A casing sleeve having a rear end and a front end surrounds the nozzle body and has an air intake opening in the region of its rear end and an outlet opening in the region of its front end, an intermediate space being formed between the nozzle body and the casing sleeve. An outer sleeve surrounds the casing sleeve at least in the region of the rear end of the casing sleeve.

22 Claims, 2 Drawing Sheets

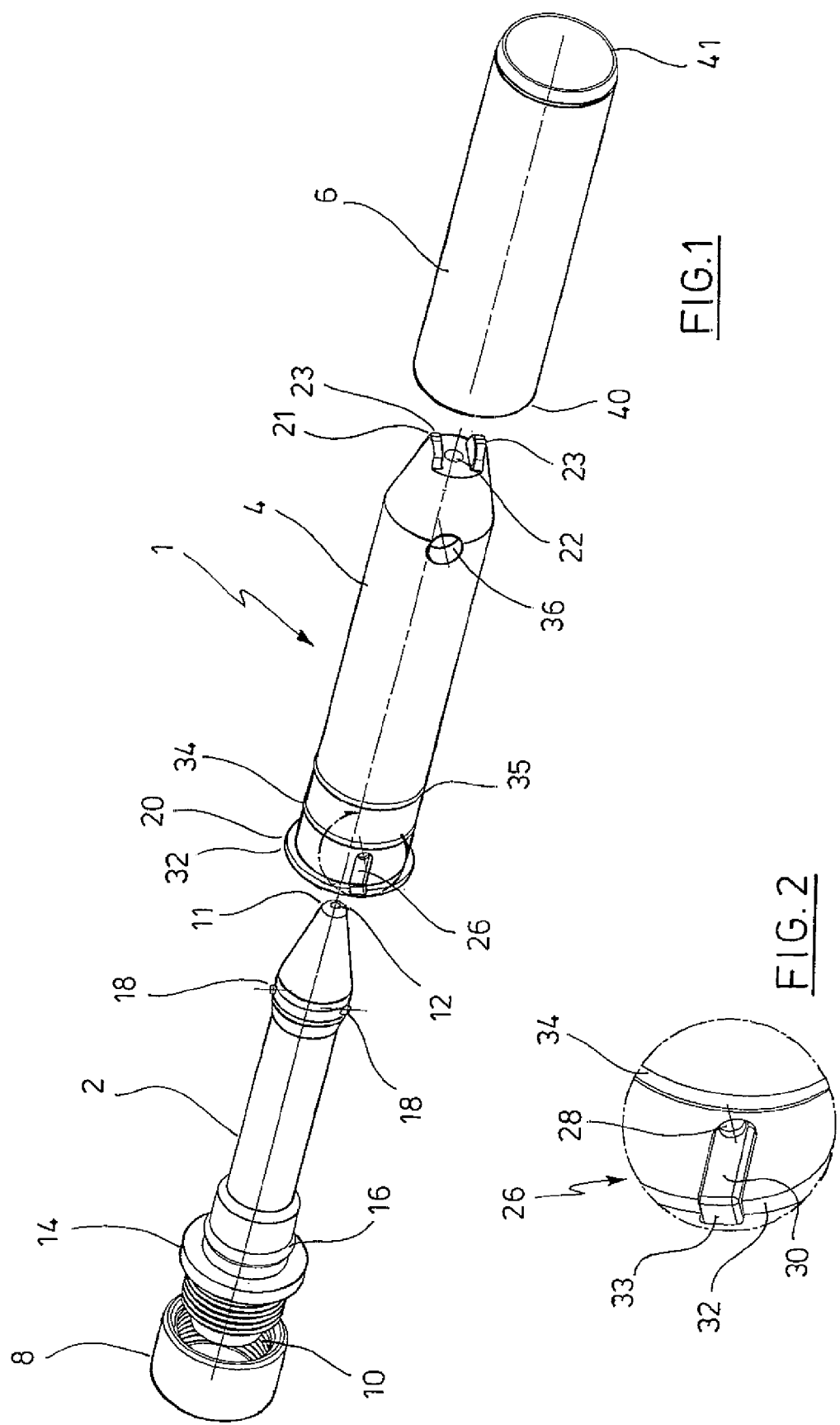

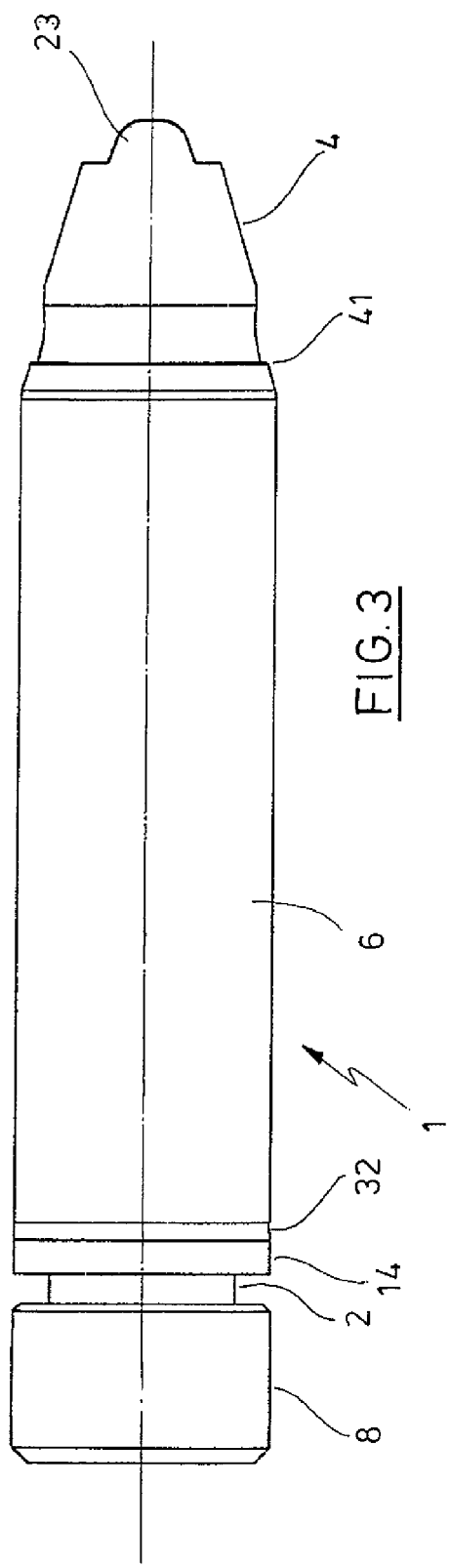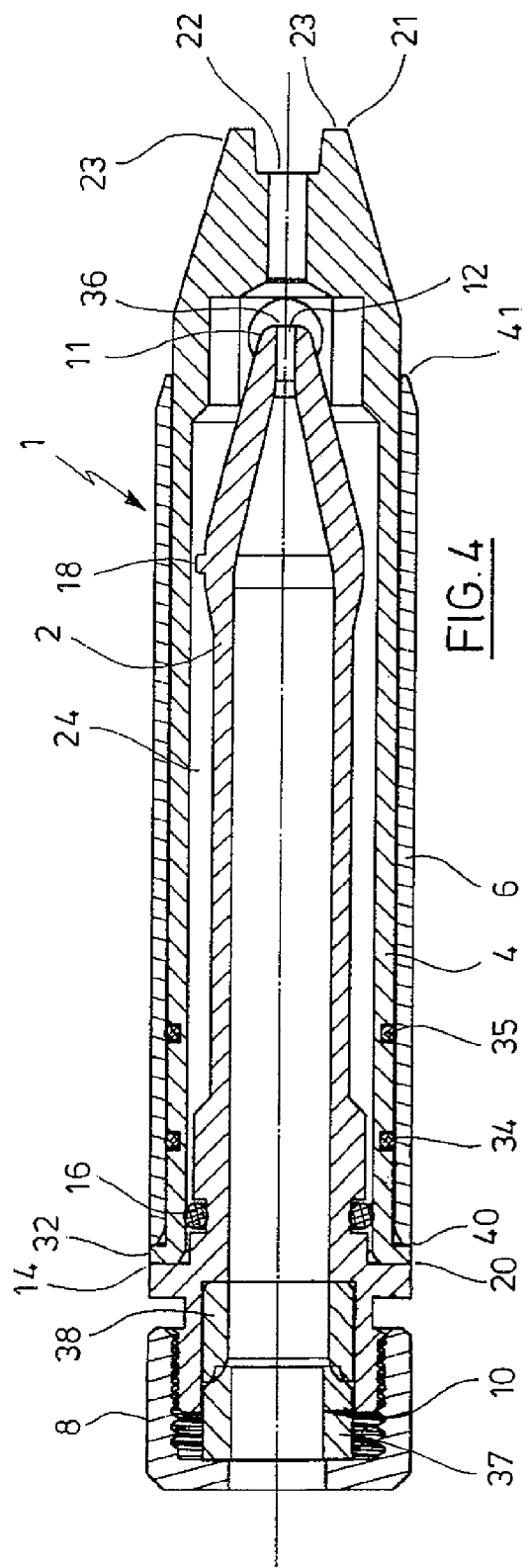

DEVICE FOR PREPARING FROTH

RELATED APPLICATION

This application claims priority of German Application Serial No. DE 10 2005 055 124.6, filed Nov. 18, 2005, which is hereby incorporated by reference herein.

BACKGROUND OF THE INVENTION

1. Field of the Invention

The invention relates to a device for preparing froth, in particular for preparing milk froth by means of hot steam output by a domestic coffee machine.

2. Discussion of Prior Art

DE 35 38 041 C2 discloses a device for heating and emulsifying milk, which can be used in particular for preparing cappuccino. This device has an elongate nozzle body having a rear end and a front end, which is connected in the region of its rear end to a hot steam source, as fitted in some domestic coffee machines. An outlet nozzle is situated in the region of the front end of the nozzle body. The nozzle body is surrounded by a casing sleeve which has an air intake opening in the region of its rear end and an outlet opening in the region of its front end, an intermediate space being provided between the nozzle body and the casing sleeve. Furthermore, the casing sleeve has a liquid intake opening in the region of its front end.

In order to produce the milk froth for a cappuccino drink using the previously known device, the device is submerged with its front end region into a vessel containing milk while hot steam is conducted into the nozzle body from an external source. When the hot steam flows out at the front end of the nozzle body, it entrains, via a venturi effect, air flowing through the air intake opening and the intermediate space between casing sleeve and nozzle body, so that a mixture of hot steam and air enters the milk, which causes the milk to emulsify and break up. Furthermore, a venturi effect likewise causes milk to be conveyed through the front region of the device through the liquid intake opening submerged in the milk, which leads to a further swirling and improvement of the froth formation.

A similar device is known from DE 88 06 220 U1, but a liquid intake opening is not provided therein.

SUMMARY OF THE INVENTION

It is object of the invention to improve the previously known devices for preparing froth.

This object is achieved by means of a device for preparing froth, in particular for preparing milk froth by means of hot steam output by a domestic coffee machine, with the features as claimed. Advantageous refinements of the invention emerge from the subclaims.

The device according to the invention has an elongate nozzle body having a rear end and a front end, which can be connected in the region of its rear end to a hot steam source and which has an outlet nozzle in the region of its front end. The nozzle body is surrounded by a casing sleeve having a rear end and a front end, which has an air intake opening in the region of its rear end and an outlet opening in the region of its front end. An intermediate space is formed between the nozzle body and the casing sleeve. The casing sleeve is surrounded by an outer sleeve at least in the region of its rear end. The outer sleeve is preferably adjustable, for example displaceable and/or rotatable, with respect to the casing sleeve, with the effective size of the air intake opening being able to be set by adjusting the outer sleeve.

The outer sleeve provided according to the invention firstly improves the design of the device and constitutes an additional heat insulation for the nozzle body through which hot steam flows and secondly opens up the possibility of adjusting the effective size of the air intake opening. By setting the effective size of the air intake opening, the froth formation can be optimized and matched to the user's requirements and to the properties of the milk used in the particular instance.

In a preferred embodiment, the air intake opening penetrates the casing sleeve at a distance from the rear end of the casing sleeve and is guided via a channel on the outside of the casing sleeve as far as a stop at the rear end of the casing sleeve. The stop is preferably designed as an outwardly projecting ring which has a cutout at the rear end of the channel. In a design of this type, the actual opening of the casing sleeve is unobtrusively concealed behind the outer sleeve but a greater or lesser amount of the channel can be exposed by displacing the outer sleeve, with the result that the effective size of the air intake opening can easily be set via the flow resistance in that part of the channel which is covered by the outer sleeve. It is also conceivable to design the channel conically or in more general terms with a non-constant cross section (i.e. the side walls of the channel do not run parallel to one another and/or the base of the channel does not run parallel to the outer sleeve), so that the effective size of the air intake opening can be set within a relatively large range upon displacement of the outer sleeve.

At least one O-ring is preferably arranged between the casing sleeve and the outer sleeve, for example in the region of the rear end of the casing sleeve. O-rings of this type can serve to lock the outer sleeve but also to seal it in order to prevent the undefined intake of additional air via the outer sleeve. If required, the outer sleeve can be entirely removed from the device, for example for cleaning purposes.

It is also conceivable for the outer sleeve to be guided adjustably in the longitudinal direction on the casing sleeve via a screw thread, so that, by means of a rotational movement, a displacement of the outer sleeve in the longitudinal direction of the device is brought about.

In a preferred embodiment of the invention, the casing sleeve has at least one liquid intake opening in the region of its front end, as known in principle from DE 35 38 041 C2. In order to improve the possibilities of variation in the preparation of milk froth, in an advantageous refinement the effective size of the liquid intake opening can be set by adjusting the outer sleeve. In this case, it is conceivable for the setting of the effective size of the air intake opening and the setting of the effective size of the liquid intake opening to be coupled to each other. This can be achieved, for example, by an opening in the outer sleeve that is arranged in the region of the liquid intake opening and, when the outer sleeve is displaced or rotated, opens up a greater or lesser amount of the liquid intake opening in coordination with the change in the effective size of the air intake opening that has taken place in the process. In this manner, an inter-relationship between the effective sizes of the air intake opening and the liquid intake opening is predetermined at the factory, with the result that, although the user has fewer free setting possibilities, the device is largely pre-equipped to the customary conditions to be expected and is therefore simpler to operate.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 shows an exploded view of an embodiment of the device according to the invention for preparing froth;

FIG. 2 shows an enlargement of a detail from FIG. 1;

FIG. 3 shows a side view of the assembled device according to FIG. 1; and

FIG. 4 shows a longitudinal section through the assembled device according to FIG. 1.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

FIG. 1 illustrates the individual parts of an embodiment of a device 1 for preparing froth with reference to an exploded illustration.

The device 1 has a nozzle body 2, a casing sleeve 4 and an outer sleeve 6. A screw connection 8 is situated at the rear end 10 of the nozzle body 2 and serves for the connection, for example, of a pipe in order to connect the device 1 to a hot steam source. A hot steam source of this type is, for example, part of some coffee machines.

As is apparent in particular from FIGS. 1 and 4, an outlet nozzle 12 is situated at the front end 11 of the nozzle body 2. In the vicinity of its rear end 10, the nozzle body 2 is provided with an encircling shoulder 14. Not far therefrom, an O-ring 16 is arranged in a groove on the outside of the nozzle body 2 and protrudes somewhat over the outer surface of the nozzle body 2. In the front region, three projections 18 distributed uniformly over the circumference emerge from the nozzle body 2.

The O-ring 16 and the projections 18 serve to lock and guide the casing sleeve 4 which, in the assembled state according to FIGS. 3 and 4, bears with its rear end 20 against the shoulder 14 of the nozzle body 2. In this case, the O-ring 16 is compressed somewhat and provides frictional forces which hold the casing sleeve 4 on the nozzle body 2. Furthermore, the O-ring 16 acts as a seal.

At its front end 21, the casing sleeve 4 is provided with an outlet opening 22 which extends in the form of a channel through a conically tapering, front end region of the casing sleeve 4 and opens between two projections 23. An intermediate space 24 is formed between the nozzle body 2 and the casing sleeve 4.

In the rear end region of the casing sleeve 4 there is an air intake opening 26, see FIG. 1, which is shown in an enlarged view in FIG. 2. The air intake opening 26 has a hole 28 which passes through the wall of the casing sleeve 4 and provides access to the intermediate space 24. From the hole 28 there emerges a channel, which is designed as a longitudinal groove 30, in the wall of the casing sleeve 4, the channel extending to the rear as far as a stop 32 which projects annularly outwards. The stop 32 is provided at the end of the longitudinal groove 30 with a cutout 33, see FIG. 2.

In the rear region of the casing sleeve 4 there are two O-rings 34 and 35 which are arranged at a distance, are embedded in peripheral grooves and protrude slightly over the outer surface of the casing sleeve 4. The O-rings 34 and 35 serve to lock the outer sleeve 6 and as a seal.

In the vicinity of its front end 21, the casing sleeve 4 is provided with a liquid intake opening 36, see FIG. 1 and FIG. 4.

While the illustrated sleeves 4,6 are releasably retained in adjustable relative positions by the O-rings 34,35, the principles of the present invention are also applicable where the outer sleeve 6 is adjustably positioned in the longitudinal direction on the casing sleeve 4 by other securing means, such as complemental screw threads.

In the illustrations according to FIG. 3 and FIG. 4, the outer sleeve 6 is pushed entirely onto the casing sleeve 4, the rear end 40 of the outer sleeve 6 bearing against the stop 32 of the casing sleeve 4. In this case, the front end 41 of the outer sleeve 6 lies behind the liquid intake opening 36. The outer sleeve 6 is secured by the two O-rings 34 and 35 in this state.

In the state illustrated in FIG. 4, air can enter via the cutout 33, the longitudinal groove 30 and the hole 28 into the intermediate space 24 through the air intake opening 26. The effective size of the air intake opening 26 is minimal here. In order to increase the effective size of the air intake opening 26, the outer sleeve 6 can be pulled forward somewhat. As a result, the rear zone of the longitudinal groove 30 is exposed, so that only the front zone of the longitudinal groove 30 is closed by the outer sleeve 6 and acts as a flow channel; in this state, the flow resistance of the air intake opening 26 is less than in the state illustrated in FIG. 4, in which the longitudinal groove 30 is outwardly closed over its entire length by the outer sleeve 6. By displacement of the outer sleeve 6 along the casing sleeve 4, the flow resistance or the effective size of the air intake opening 26 can therefore be set.

In order to use the device 1 to prepare milk froth, for example as a froth head for cappuccino, the device 1 is connected by means of the screw connection 8 to a hot steam source. In the exemplary embodiment, the hot steam source is integrated in a coffee machine and leads to a connection piece over which the screw connection 8 is pushed. When the screw connection 8 is screwed on, a compression ring 37 presses onto a sealing ring 38 made of an elastomer in order to seal off the connection. If the hot steam source is now switched on, the hot steam produced thereby flows through the nozzle body 2 over the entire length and emerges at the outlet nozzle 12 from which the hot steam passes to the outside through the outlet opening 22 in the casing sleeve 4. In this case, the user holds the device 1 with its front region in a vessel containing milk, so that the hot steam bubbles up through the milk and, owing to its high temperature, emulsifies the milk. The projections 23 prevent the outlet opening 22 being closed, for example by the vessel floor.

The flow conditions in the device 1 cause a negative pressure in the intermediate space 24 when the hot steam leaves the outlet nozzle 12 of the nozzle body 2. As a result, air is sucked up via the air intake opening 26 into the intermediate space 24, mixes with the hot steam and emerges together with the hot steam at the outlet opening 22. This improves the froth formation. The user can regulate the amount of air sucked up per unit of time by displacing the outer sleeve 6 along the casing sleeve 4.

Furthermore, the flow conditions within the device 1 result in a negative pressure behind the liquid intake opening 36, so that milk is sucked into the front region of the intermediate space 24, swirled with the hot steam and the air which has been sucked up and is ejected again through the outlet opening 22. As a result, the froth formation is very efficient.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A device for preparing froth using a steam source, said device comprising:
   an elongate nozzle body having a rear end and a front end, said nozzle body connectable to the steam source adjacent the rear end,
   said nozzle body presenting an outlet nozzle adjacent the front end;
   a casing sleeve having a rear portion and a front portion, said casing sleeve surrounding the nozzle body and presenting an air intake opening in the rear portion and an outlet opening in the front portion, with an intermediate space being formed between the nozzle body and the casing sleeve; and
   an outer sleeve surrounding the casing sleeve at least about the rear portion,
   said outer sleeve being adjustable with respect to the casing sleeve, with the effective size of the air intake opening being able to be set by adjusting the outer sleeve.

2. The device as claimed in claim 1,
   said rear portion of the casing sleeve presenting an endmost rear margin,
   said air intake opening penetrating the casing sleeve at a distance from the rear margin of the casing sleeve and being guided via a channel on the outside of the casing sleeve as far as a stop at the rear margin of the casing sleeve.

3. The device as claimed in claim 2,
   said stop being an outwardly projecting ring which presents a cutout at the rear margin of the channel.

4. The device as claimed in claim 1; and
   at least one O-ring being arranged between the casing sleeve and the outer sleeve.

5. The device as claimed in claim 1,
   said outer sleeve being axially shiftable relative to the casing sleeve to adjustably set the effective size of the air intake opening.

6. The device as claimed in claim 2,
   said channel being a longitudinal groove.

7. The device as claimed in claim 1,
   said casing sleeve having at least one liquid intake opening in the front portion.

8. The device as claimed in claim 7,
   wherein the effective size of the liquid intake opening can be set by adjusting the outer sleeve.

9. The device as claimed in claim 1,
   said rear portion of the casing sleeve presenting an endmost rear margin,
   said air intake opening penetrating the casing sleeve at a distance from the rear margin of the casing sleeve and being guided via a channel on the outside of the casing sleeve as far as a stop at the rear margin of the casing sleeve.

10. A device for preparing froth using a steam source, said device comprising:
    an elongate nozzle body having a rear end and a front end, said nozzle body connectable to the steam source adjacent the rear end,
    said nozzle body presenting an outlet nozzle adjacent the front end;
    a casing sleeve having a rear portion and a front portion, said casing sleeve surrounding the nozzle body and presenting an air intake opening in the rear portion and an outlet opening in the front portion, with an intermediate space being formed between the nozzle body and the casing sleeve; and
    an outer sleeve surrounding the casing sleeve at least about the rear portion,
    said casing sleeve having at least one liquid intake opening in the front portion,
    wherein the effective size of the liquid intake opening can be set by adjusting the outer sleeve.

11. A device for preparing froth using a steam source, said device comprising:
    an elongate nozzle body having a rear end and a front end, said nozzle body connectable to the steam source adjacent the rear end,
    said nozzle body presenting an outlet nozzle adjacent the front end;
    a casing sleeve having a rear portion and a front portion, said casing sleeve surrounding the nozzle body and presenting an air intake opening in the rear portion and an outlet opening in the front portion, with an intermediate space being formed between the nozzle body and the casing sleeve; and
    an outer sleeve surrounding the casing sleeve at least about the rear portion,
    said casing sleeve having at least one liquid intake opening in the front portion,
    wherein setting of the effective size of the air intake opening and the setting of the effective size of the liquid intake opening are both controlled by movement of the outer sleeve.

12. A coffee machine operable to prepare milk froth, said coffee machine comprising:
    a source of steam; and
    a milk frothing device including—
      an elongate nozzle body having a rear end and a front end,
      said nozzle body being connected to the steam source adjacent the rear end,
      said nozzle body presenting an outlet nozzle adjacent the front end,
      a casing sleeve having a rear portion and a front portion, said casing sleeve surrounding the nozzle body and presenting an air intake opening in the rear portion and an outlet opening in the front portion, with an intermediate space being formed between the nozzle body and the casing sleeve, and
      an outer sleeve surrounding the casing sleeve at least about the rear portion,
    said outer sleeve being adjustable with respect to the casing sleeve, with the effective size of the air intake opening being able to be set by adjusting the outer sleeve.

13. The coffee machine as claimed in claim 12,
    said rear portion of the casing sleeve presenting an endmost rear margin,
    said air intake opening penetrating the casing sleeve at a distance from the rear margin of the casing sleeve and being guided via a channel on the outside of the casing sleeve as far as a stop at the rear margin of the casing sleeve.

14. The coffee machine as claimed in claim 13,
said stop being an outwardly projecting ring which presents a cutout at the rear margin of the channel.

15. The coffee machine as claimed in claim 12, and at least one O-ring being arranged between the casing sleeve and the outer sleeve.

16. The coffee machine as claimed in claim 12,
said outer sleeve being axially shiftable relative to the casing sleeve to adjustably set the effective size of the air intake opening.

17. The coffee machine as claimed in claim 13,
said channel being a longitudinal groove.

18. The coffee machine as claimed in claim 12,
said casing sleeve having at least one liquid intake opening in the front portion.

19. The coffee machine as claimed in claim 18,
wherein the effective size of the liquid intake opening can be set by adjusting the outer sleeve.

20. The coffee machine as claimed in claim 12,
said rear portion of the casing sleeve presenting an endmost rear margin,
said air intake opening penetrating the casing sleeve at a distance from the rear margin of the casing sleeve and being guided via a channel on the outside of the casing sleeve as far as a stop at the rear margin of the casing sleeve.

21. A coffee machine operable to prepare milk froth, said coffee machine comprising:
a source of steam: and
a milk frothing device including—
an elongate nozzle body having a rear end and a front end,
said nozzle body being connected to the steam source adjacent the rear end,
said nozzle body presenting an outlet nozzle adjacent the front end,
a casing sleeve having a rear portion and a front portion,
said casing sleeve surrounding the nozzle body and presenting an air intake opening in the rear portion and an outlet opening in the front portion, with an intermediate space being formed between the nozzle body and the casing sleeve, and
an outer sleeve surrounding the casing sleeve at least about the rear portion,
said casing sleeve having at least one liquid intake opening in the front portion,
wherein the effective size of the liquid intake opening can be set by adjusting the outer sleeve.

22. A coffee machine operable to prepare milk froth, said coffee machine comprising:
a source of steam: and
a milk frothing device including—
an elongate nozzle body having a rear end and a front end,
said nozzle body being connected to the steam source adjacent the rear end,
said nozzle body presenting an outlet nozzle adjacent the front end,
a casing sleeve having a rear portion and a front portion,
said casing sleeve surrounding the nozzle body and presenting an air intake opening in the rear portion and an outlet opening in the front portion, with an intermediate space being formed between the nozzle body and the casing sleeve, and
an outer sleeve surrounding the casing sleeve at least about the rear portion,
said casing sleeve having at least one liquid intake opening in the front portion,
wherein setting of the effective size of the air intake opening and the setting of the effective size of the liquid intake opening are both controlled by movement of the outer sleeve.

* * * * *